(12) United States Patent
Li et al.

(10) Patent No.: US 12,249,317 B2
(45) Date of Patent: Mar. 11, 2025

(54) JOINT UNSUPERVISED AND SUPERVISED TRAINING FOR MULTILINGUAL ASR

(71) Applicant: Google LLC, Mountain View, CA (US)

(72) Inventors: Bo Li, Fremont, CA (US); Junwen Bai, Mountain View, CA (US); Yu Zhang, Mountain View, CA (US); Ankur Bapna, Sunnyvale, CA (US); Nikhil Siddhartha, Mountain View, CA (US); Khe Chai Sim, Dublin, CA (US); Tara N. Sainath, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 313 days.

(21) Appl. No.: 17/929,934

(22) Filed: Sep. 6, 2022

(65) Prior Publication Data

US 2023/0104228 A1  Apr. 6, 2023

Related U.S. Application Data

(60) Provisional application No. 63/262,174, filed on Oct. 6, 2021.

(51) Int. Cl.
*G10L 15/16* (2006.01)
*G10L 15/02* (2006.01)
(Continued)

(52) U.S. Cl.
CPC ............ *G10L 15/063* (2013.01); *G10L 15/02* (2013.01); *G10L 15/16* (2013.01); *G10L 15/19* (2013.01)

(58) Field of Classification Search
None
See application file for complete search history.

(56) References Cited

U.S. PATENT DOCUMENTS 10,783,601 B1 * 9/2020 Rodriguez ............ G06T 1/0028
11,551,668 B1 * 1/2023 Baevski ............. G06F 18/2155
(Continued)

OTHER PUBLICATIONS

International Search Report and Written Opinion of Application No. PCT/US2022/075998 dated Nov. 24, 2022, 67 pages.
(Continued)

*Primary Examiner* — Seong-Ah A Shin
(74) *Attorney, Agent, or Firm* — Honigman LLP; Brett A. Krueger; Grant Griffith

(57) ABSTRACT

A method includes receiving audio features and generating a latent speech representation based on the audio features. The method also includes generating a target quantized vector token and a target token index for a corresponding latent speech representation. The method also includes generating a contrastive context vector for a corresponding unmasked or masked latent speech representation and deriving a contrastive self-supervised loss based on the corresponding contrastive context vector and the corresponding target quantized vector token. The method also include generating a high-level context vector based on the contrastive context vector and, for each high-level context vector, learning to predict the target token index at the corresponding time step using a cross-entropy loss based on the target token index. The method also includes predicting speech recognition hypotheses for the utterance and training a multilingual automatic speech recognition (ASR) model using an unsupervised loss and a supervised loss.

20 Claims, 6 Drawing Sheets

(51) Int. Cl.
*G10L 15/06* (2013.01)
*G10L 15/187* (2013.01)
*G10L 15/19* (2013.01)

(56) References Cited

U.S. PATENT DOCUMENTS

| | | | |
|---|---|---|---|
| 2017/0103752 A1* | 4/2017 | Senior | G10L 15/16 |
| 2020/0160836 A1* | 5/2020 | Chen | G10L 15/16 |
| 2020/0380215 A1* | 12/2020 | Kannan | G10L 15/005 |
| 2022/0103839 A1* | 3/2022 | Van Rozendaal | H04N 19/147 |
| 2022/0366898 A1* | 11/2022 | Qian | G10L 15/187 |
| 2022/0385907 A1* | 12/2022 | Zhang | H04N 19/103 |

OTHER PUBLICATIONS

Alexei Baevski et al: "Effectiveness of self-supervised pre-training for speech recognition", arxiv.org, Cornell University Library, 201 Olin Library Cornell University Ithaca, NY 14853, Nov. 10, 2019 (Nov. 10, 2019), XP081529699 , 10 pages.

Bai, Junwen, et al. "Joint unsupervised and supervised training for multilingual asr." ICASSP 2022-2022 IEEE International Conference on Acoustics, Speech and Signal Processing (ICASSP). IEEE, 2022.

Office Action issued in related Japanese Patent Application No. JP2024-520856, dated Dec. 24, 2024.

\* cited by examiner

JOINT UNSUPERVISED AND SUPERVISED TRAINING FOR MULTILINGUAL ASR

CROSS REFERENCE TO RELATED APPLICATIONS

This U.S. Patent Application claims priority under 35 U.S.C. § 119(e) to U.S. Provisional Application 63/262,174, filed on Oct. 6, 2021. The disclosure of this prior application is considered part of the disclosure of this application and is hereby incorporated by reference in its entirety.

TECHNICAL FIELD

This disclosure relates to joint unsupervised and supervised training for multilingual automated speech recognition (ASR).

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve performance in both accuracy (e.g., a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Unlabeled training data and labeled training data can be incorporated to increase the volume of training data used to train the ASR models.

SUMMARY

One aspect of the disclosure provides a joint unsupervised and supervised training (JUST) framework for training a multilingual automatic speech recognition (ASR) model. The JUST framework includes a feature encoder configured to receive audio features corresponding to an utterance of speech as input and generate a latent speech representation at each of a plurality of time steps. The JUST framework also includes a quantizer configured to receive, as input, the latent speech representations generated by the feature encoder at each of the plurality of time steps and generate, at each of the plurality of time steps, a target quantized vector token and a target token index for a corresponding latent speech representation generated by the feature encoder. Here, the target token index maps the corresponding latent speech representation to the target quantized vector token stored in a codebook. The JUST framework also includes a contrastive net configured to: receive, as input, the latent speech representations generated by the feature encoder at each of the plurality of time steps after masking a subset of the latent speech representations; generate, at each of the plurality of time steps, a contrastive context vector for the corresponding unmasked or masked latent speech representation; and derive, at each of the plurality of time steps, a contrastive self-supervised loss based on the corresponding contrastive context vector and the corresponding target quantized vector token generated by the quantizer for the corresponding latent speech representation. The JUST framework also includes a masked language modeling (MLM) module configured to: receive, as input, the contrastive context vector generated by the contrastive net at each of the plurality of time steps; generate, at each of the plurality of time steps, a high-level context vector; and for each high-level context vector, learn to predict the target token index at the corresponding time step using a cross-entropy loss based on the target token index generated by the quantizer at the corresponding time step. The JUST framework also includes a decoder configured to receive, as input, the high-level context vector generated by the MLM module at each of the plurality of time steps and predict speech recognition hypotheses for the utterance. Here, the JUST framework trains the multilingual ASR model on an unsupervised loss based on the cross-entropy loss and the contrastive self-supervised loss and a supervised loss based on the predicted speech recognition hypotheses and a ground-truth transcription of the utterance.

Implementations of the disclosure may include one or more of the following optional features. In some implementations, the feature encoder includes two convolutional neural network (CNN) blocks. In some examples, masking the subset of the latent speech representations includes randomly replacing each latent speech representation in the subset of latent speech representations with a corresponding random vector. The contrastive self-supervised loss derived by the contrastive net may further be based on K negative samples/distractors uniformly sampled from the target quantized vector token stored in the codebook that correspond to masked latent representations from the masked subset of latent representations.

In some implementations, the supervised loss is further based on an entropy-based diversity loss associated with the codebook. The multilingual ASR model is trained on training utterances spoken in a plurality of different languages. In some examples, training the multilingual ASR model includes training the multilingual ASR model having no prior pretraining. In other examples, training the multilingual ASR model includes finetuning the multilingual ASR model from a pretrained checkpoint. In some implementations, the training the multilingual ASR model includes jointly training the multilingual ASR model on the unsupervised loss and the supervised loss. The supervised loss may include a Recurrent Neural Network-Transducer (RNN-T) loss.

Another aspect of the disclosure provides a system that includes data processing hardware and memory hardware storing instructions that when executed on the data processing hardware causes the data processing hardware to perform operations. The operations include receiving audio features that correspond to an utterance of speech and generating, at each of a plurality of time steps, a latent speech representation based on the audio features. The operations also include generating, at each of the plurality of time steps, a target quantized vector token and a target token index for a corresponding latent speech representation. The target token index maps the corresponding latent speech representation to the target quantized vector token stored in a codebook. The operations also include generating, at each of the plurality of time steps, a contrastive context vector for a corresponding unmasked or masked latent speech representation. The operations also include deriving, at each of the plurality of time steps, a contrastive self-supervised loss based on the corresponding contrastive vector and the corresponding target quantized vector token. The operations also include generating, at each of the plurality of time steps, a high-level context vector based on the contrastive context vector and, for each high-level context vector, learning to predict the target token index at the corresponding time step using a cross-entropy loss based on the target token index. The operations also include predicting speech recognition hypotheses for the utterance based on the high-level context vectors and training a multilingual automatic speech recognition (ASR) model using an unsupervised loss based on the contrastive self-supervised losses and the cross-entropy losses and a supervised loss based on the predicted speech recognition hypotheses and a ground-truth transcription of the utterance.

Implementations of the disclosure may include one or more of the following optional features. In some implementations, generating the latent speech representation includes generating, by a feature encoder, the latent speech representation at each of the plurality of time steps. The feature encoder includes two convolutional neural network (CNN) blocks. The operations may further include masking a subset of the latent speech representations by randomly replacing each latent speech representation in the subset of latent speech representations with a corresponding random vector. In some examples, the contrastive self-supervised loss is further based on K negative samples/distracters uniformly samples from the target quantized vector token stored in the codebook that correspond to masked latent representations from a masked subset of latent representations.

In some implementations, the unsupervised loss is further based on an entropy-based diversity loss associated with the codebook. The multilingual ASR model may be trained on training utterances spoken in a plurality of different languages. In some examples, training the multilingual ASR model includes training the multilingual ASR model having no prior pretraining. Training the multilingual ASR model may include finetuning the multilingual ASR model from a pretrained checkpoint. In some implementations, training the multilingual ASR model includes jointly training the multilingual ASR model on the unsupervised and the supervised loss. In some examples, the supervised loss includes a Recurrent Neural Network-Transducer (RNN-T) loss.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
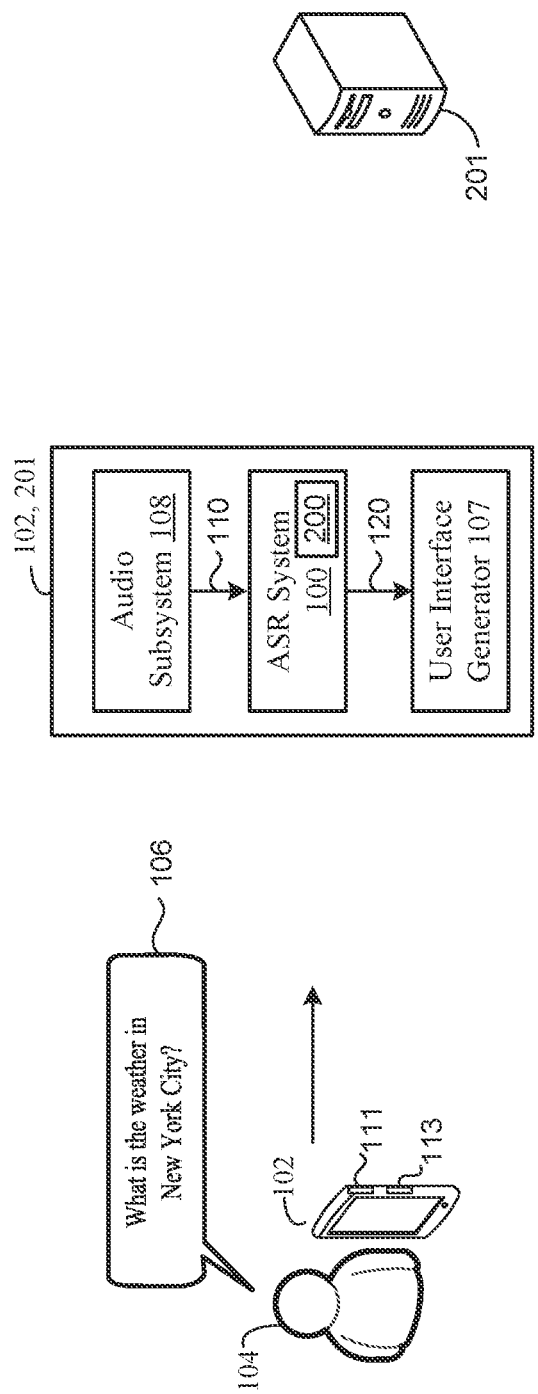
FIG. 1 is a schematic view of an example speech recognition system.

The use of pretraining automatic speech recognition (ASR) models has demonstrated an effective method for learning general latent representations from large-scale unlabeled training data. Pretraining ASR models significantly reduces the training complexity for downstream fine-tuning. Here, fine-tuning refers to performing supervised training on a pretrained ASR model using a small labeled training data set because the ASR model has already been pretrained using unlabeled training data. Thus, after an ASR model is pretrained, the pretrained ASR model may train (i.e., fine-tune train) using only a smaller and/or less diverse labeled training data set. Notably, fine-tuning the pretrained ASR model using the smaller labeled training data set still achieves similar (or better) performance than a ASR model that receives no pretraining and trains using a larger and/or more diverse set of labeled training data.

Pretraining ASR models usually includes a two-stage approach. In a first stage, the ASR model trains using a self-supervised loss derived from unlabeled training data to learn general latent representations. Thereafter, in a second stage, the ASR model fine-tunes its training based on a supervised loss. Here, the second stage of training only requires a small set of labeled training data (i.e., audio data with corresponding labeled transcriptions) because the ASR model has already been pretrained using the unlabeled training data. This two stage training approach has proven successful for sequence modeling, but there are some issues with this approach. For instance, a pretrained model is susceptible to catastrophic forgetting. That is, the pretrained model may forget the latent representations previously learned during the first stage of training using unlabeled training data. Stated differently, training the ASR model using a supervised loss in the second stage may overwrite the latent representations learned from the first stage of training, thereby diminishing any benefit received from pretraining the ASR model in the first stage. Forgetting previously learnt latent representations is especially prevalent when the labeled training data set is large.

Another issue with the two-stage training approach is the pretrained checkpoint selection. A pretrained checkpoint is where the pretraining (i.e., first stage) of the ASR model ends and the fine-tune training (i.e., second stage) begins. As such, the pretrained checkpoint varies based on how much pretraining the ASR model receives. In particular, the issue is determining when to stop pretraining and begin fine-tune training. Notably, performing too much pretraining can actually lead to a degradation in performance of the ASR model. On the other hand, performing too little pretraining can also lead to a degradation in performance of the ASR model. Moreover, the issue of pretrained checkpoint selection is even more severe in multilingual ASR models because the different languages of the multilingual training dataset are often imbalanced.

Accordingly, implementations herein are directed toward training an automatic speech recognition (ASR) model using a joint unsupervised and supervised training (JUST) process. The JUST process may train ASR models from scratch (i.e., ASR models that did not receive any pretraining) or train pretrained ASR models from a pretrained checkpoint. Moreover, the JUST process may train monolingual or multilingual ASR models. As will become apparent, the JUST process trains the ASR model using an unsupervised loss derived from a cross-entropy loss and a self-supervised loss and a supervised loss derived from a predicted speech recognition hypotheses and a ground-troth transcription.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing; environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames (i.e., audio features) 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2:
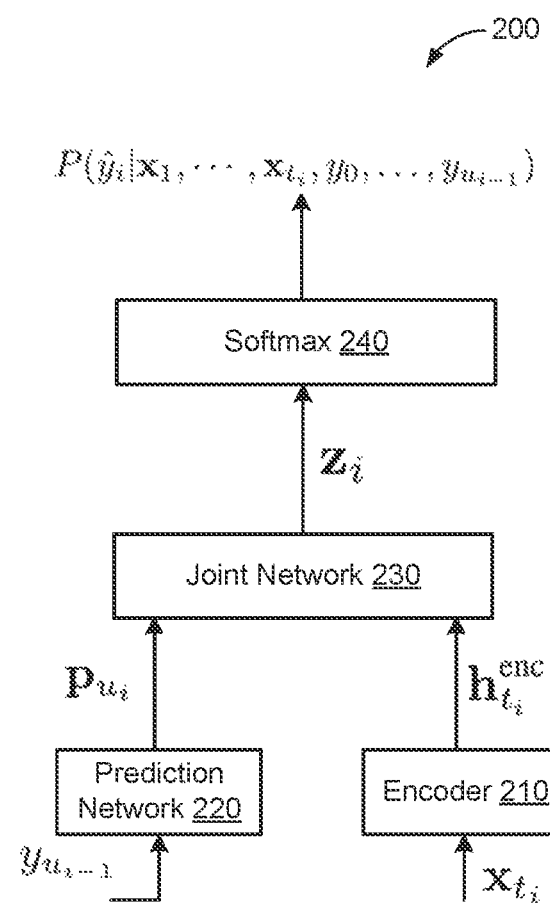
FIG. 2 is a schematic view of a Recurrent Neural Network-Transducer (RNN-T) model architecture.

Referring to FIG. 2, an example ASR model 200 may be a frame alignment-based transducer model 200 that includes a Recurrent Neural Network-Transducer (RNN-T) model architecture which adheres to latency constraints associated with interactive applications. The use of the RNN-T model architecture is exemplary, and the frame alignment-based transducer model 200 may include other architectures such as transformer-transducer, conformer-transducer, and conformer-encoder model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder network 210 reads a sequence of d-dimensional feature vectors (e.g., acoustic frames 110 (FIG. 1)) $x=(x_1, x_2, \ldots, x_T)$, where $x_t \in \mathbb{R}^d$, and produces at each output step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network 230 then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network 210 of the RNN-T model 200 includes a stack of self-attention layers/blocks, such as conformer blocks. Here, each conformer block includes a series of multi-headed self attention, depth wise convolution and teed-forward layers. The encoder network 210 may include LSTM layers in lieu of self-attention layers/blocks.

The prediction network 220 may have two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The softmax layer 240 may be composed of a unified word piece or grapheme set that is generated using all unique word pieces or graphemes in a plurality of training data sets.

Figure 3A:
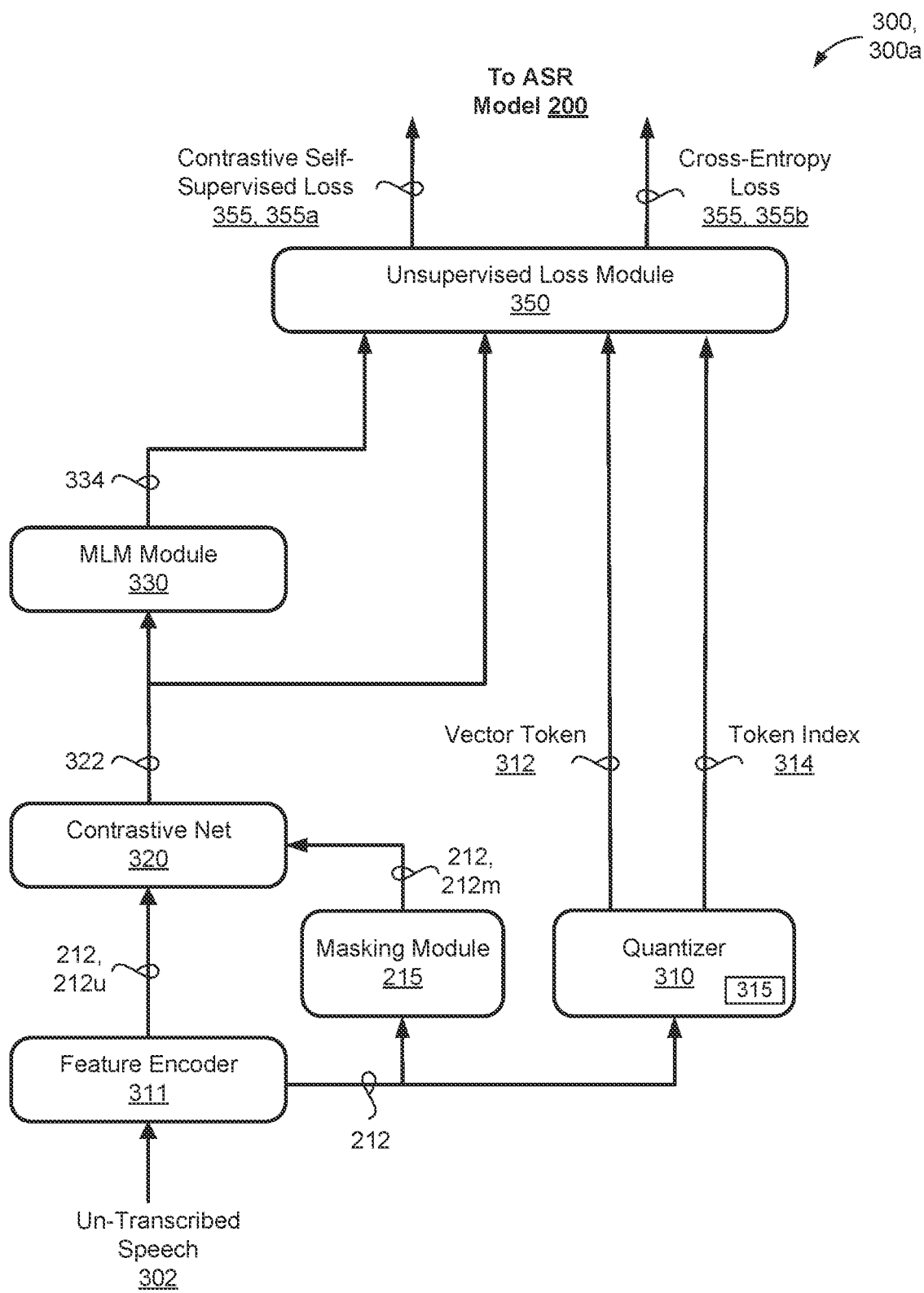
FIGS. 3A and 3B are schematic views of an example training process for training a speech recognition model.
Figure 3B:
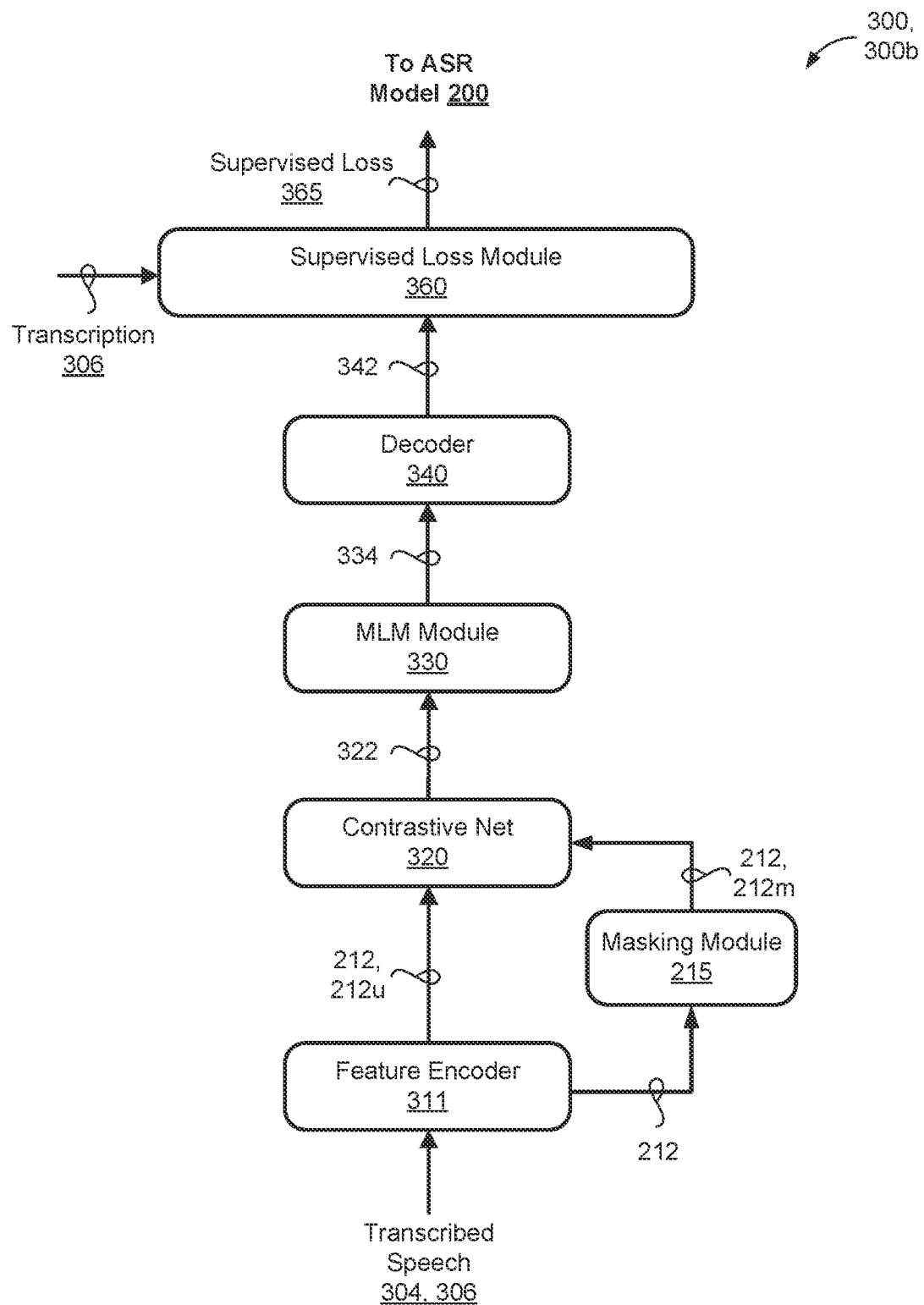

FIGS. 3A and 3B illustrate an example JUST training process 300 for training the ASR model 200 (FIG. 2). The ASR model 200 may be a multilingual ASR model or a monolingual ASR model. In some implementations, the example JUST training process 300 (also referred to as simply "training process 300") trains an un-trained ASR model 200. That is, the training process 300 trains an ASR model 200 that has not been pretrained yet. In other examples, the training process 300 trains a pretrained ASR model 200 from a pretrained checkpoint. Here, the ASR model 200 has been pretrained already and the training process 300 fine-tunes the pre-trained ASR model from the pretrained checkpoint.

The training process 300 may train the ASR model 200 using available training data that includes a set of un-transcribed speech utterances (i.e., unlabeled training data) 302 and a set of transcribed speech utterances (i.e., labeled training data) 304. Each un-transcribed speech utterance 302 includes audio-only data (i.e., unpaired data) such that the un-transcribed speech utterance 302 is not paired with any corresponding transcription. On the other hand, each respective transcribed speech utterance 304 includes a corresponding ground-truth transcription 306 paired with a corresponding speech representation of the respective transcribed speech utterance 304 (i.e., paired data). Moreover, the set of un-transcribed speech utterances 302 and the set of transcribed speech utterances 304 may each respectively include either non-synthetic speech representations, synthetic speech representations generated by a text-to-speech (TTS) system using textual utterances (not shown), or some combination thereof. In some examples, the set of un-transcribed speech utterances 302 and the set of transcribed speech utterances 304 each include utterances spoken in a plurality of different languages for training a multilingual ASR model.

For simplicity, the training process 300 includes an unsupervised loss part 300a (FIG. 3A) and a supervised loss part 300b (FIG. 3B). The training process 300 trains the ASR model 200 based on an unsupervised loss 355 (FIG. 3A) from the unsupervised loss part 300a and on a supervised loss 365 (FIG. 3B) from the supervised loss part 300b. In some examples, the training process 300 trains the ASR model 200 jointly using the unsupervised loss 355 and the supervised loss 365.

Continuing with FIGS. 3A and 3B, the unsupervised loss part 300a and the supervised loss part 300b both include a feature encoder 311, a masking module 215, a contrastive net 320, and a masked language modeling (MLM) module 330. Here, the training process 300 (i.e., unsupervised loss part 300a and supervised loss part 3001) may use training data that includes the set of un-transcribed speech utterances 302, the set of transcribed speech utterances 304, and/or some combination thereof (not shown). In other instances, the unsupervised loss part 300a trains the ASR model 200 using the un-transcribed speech utterances 302 and the supervised loss part 300b trains the ASR model 200 using the transcribed speech utterances 304.

The feature encoder 311 is configured to receive, as input, a sequence of input audio features/vectors $\{x_i\}_{i=1}^{L}$ (e.g., mel-frequency spectrograms such as the acoustic frames 110 of FIG. 1) corresponding to one of the un-transcribed speech utterances 302 or one of the transcribed speech utterances 304 where L represents the original length of a training speech utterance. The sequence of input audio features/vectors are associated with one of the un-transcribed speech utterances 302 or one of the transcribed speech utterances 304. After, receiving the sequence of input audio features/vectors, the feature encoder 311 generates, as output, at each of a plurality of time steps T, a latent speech representation $(\{z_i\}_{i=1}^{T})$ 212. Here, the latent speech representation 212 corresponds to a respective one of: one of the un-transcribed speech utterances 302; or one of the transcribed speech utterances 304. In some implementations, the feature encoder 311 includes two convolutional neural network (CNN) blocks (e.g., two convolutional layers) each having a 3×3 filter size and a stride of (2, 2). In these implementations, a first CNN block of the two CNN blocks may include 128 channels and a second CNN block of the two CNN blocks includes 32 channels. In other implementations, the feature encoder 311 includes a subsampling block with 4× reduction in feature dimensionality and sequence length.

The latent speech representations 212 output from the feature encoder 311 may be fed to a masking module 215 where some of the latent speech representations 212 are randomly chosen and replaced with a trained feature vector shared between all masked time steps to provide corresponding masked latent speech representations 212, 212m, Alternatively, the randomly chosen latent speech representations 212 may be replaced by random feature vectors to generate the corresponding masked latent speech representations 212m. In some examples, the masking module 215 masks the randomly chosen latent speech representations 212 by randomly sampling, without replacement, a certain proportion p of all time steps T to be start indices and then mask the subsequent M consecutive time steps from every sample index, whereby some spans may overlap. As such, the masking module 215 only masks a subset of the entire set of latent speech representations 212 resulting in a masked subset of latent speech representations 212m and a subset of unmasked latent speech representations 212, 212u.

The contrastive net 320 is configured to receive, as input, the latent speech representations 212 generated by the feature encoder 311 at each of the plurality of time steps after masking the subset of the latent speech representations 212m. Stated differently, the contrastive net 320 receives both the subset of masked latent speech representations 212m and the subset of unmasked latent speech representations 212u. Thereafter, the contrastive net 320 generates, at each of the plurality of time steps, a contrastive context vector $(\{c_i\}_{i=1}^{T})$ 322 for the corresponding unmasked latent speech representation 212u or the corresponding masked latent speech representation 212m. The contrastive net 320 may include a stack of conformer blocks each with multi-headed self-attention, depth-wise convolution and feed-forward layers. For example, the contrastive net 320 may include 8 conformer blocks where each conformer block includes a hidden dimensionality 1024, 8 attention heads, and a convolution kernels size of 5.

Referring now to FIG. 3A, in some implementations the unsupervised loss part 300a includes a quantizer 310 that also receives the latent speech representations 212. In particular, the quantizer 310 is configured to receive, as input, the latent speech representations 212 generated by the feature encoder 311 at each of the plurality of time steps and generate, at each of the plurality of time steps, a target quantized vector token 312 and a target token index 314 for a corresponding latent speech representation 212 generated by the feature encoder 311 as output. As such, the quantizer 310 generates the target quantized vector token ($q_i$) 312 and the target token index ($y_i$) 314 using latent speech representations 212 that do not include any masking. Here, the quantizer 310 generates the target quantized vector tokens 312 according to $q_i \in \{e_j\}_{j=1}^V$. The quantizer 310 summarizes all of the latent speech representations 212 into representative target quantized vector tokens (i.e., discriminative speech tokens) 312. The representative target quantized vector tokens 312 generated by the quantizer 310 represent a finite set of representative target quantized vector tokens referred to as a codebook 315. The codebook 315 is stored at the quantizer 310 and represents the size of the codebook 315. The target token index 314 maps each corresponding latent speech representation 212 to a respective one of the target quantized vector tokens 312 stored in the codebook 315. Moreover, all of the representative target quantized vector tokens 312 in the codebook 315 are learnable during the training process 300.

The unsupervised loss part 300a is dependent upon the codebook 315 to represent both positive and negative training examples. Accordingly, the training process 300 uses an entropy-based diversity loss $\mathcal{L}_d$ associated with the codebook 315 to increase the use of the representative target quantized vector tokens 312 in the codebook 315. That is, the training process 300 encourages equal use of the V entries in each codebook (G) 315 thereby maximizing the entropy of the averaged softmax distribution over the codebook entries for each codebook $\bar{p}_g$ across a batch of training utterances represented by:

$$\mathcal{L}_d = \frac{1}{GV} \sum_{g=1}^{G} -H(\bar{p}_g) = \frac{1}{GV} \sum_{g=1}^{G} \sum_{v=1}^{V} \bar{p}_{g,v} \log \bar{p}_{g,v} \quad (1)$$

In some examples, the training process 300 uses a single codebook 315 rather than multiple codebooks 315.

The MLM module 330 is configured to receive, as input, the contrastive context vector 322 generated by the contrastive net 320 at each of the plurality of time steps, and generate, as output, a high-level context vector ($\{m_i\}_{i=1}^T$) 334 at each of the plurality of time steps. That is, the MLM module 330 generates the high-level context vectors 334 by extracting high-level contextualized speech representations from the contrastive context vectors 322. Each high-level context vector 334 represents a target token index prediction generated by a linear layer. The MLM module 330 may include a stack of 16 conformer blocks each having a hidden dimensionality of 1024, 8 attention heads, and a convolution kernel size of 5.

In some implementations, the unsupervised loss part 300a includes an unsupervised loss module 350 that derives an unsupervised loss 355, The unsupervised loss module 350 may reside on the contrastive net 320 (not shown), reside on the MLM module 330, or be an independent module (e.g., reside on neither the contrastive net 320 nor the MLM module 330). The unsupervised loss module 350 receives the contrastive context vectors 322 and the target quantized vector token 312. For each respective latent speech representation 212, the unsupervised loss module 350 derives a contrastive self-supervised loss 355, 355a based on the corresponding contrastive context vector 322 from the contrastive net 320 and the corresponding target quantized vector token 312 generated by the quantizer 310. The unsupervised loss module 350 may derive the contrastive self-supervised loss 355a by:

$$\mathcal{L}_c = -\log \frac{sim(c_i, q_i)}{sim(c_i, q_i) \sum_{j=1}^{K} sim(c_i, \tilde{q}_j)} \quad (2)$$

In Equation 2, $\mathcal{L}_c$ represents the contrastive self-supervise loss 355a, $q_i$ represents the target quantized vector token 312 as the positive sample, and $\{\tilde{q}_i\}_{i=1}^K$ represents K negative samples/distracters uniformly sampled from target quantized vector tokens ($q_j$) of other masked latent speech representations 212m in the same utterance. Moreover, in Equation 2 sim(a, b) represents the exponential of the cosine similarity between a and b. Accordingly, the contrastive self-supervised loss 355a derived by the unsupervised loss module 350 is further based on K negative samples/distractors uniformly sampled from the target quantized vector token 312 stored in the codebook 315 that correspond to masked latent speech representations 212m from the masked subset of latent speech representations 212m.

The unsupervised loss module 350 also receives the target token index 324 and the high-level context vector 334. Here, for each respective latent speech representation 212, the unsupervised loss module 350 determines a cross-entropy loss ($\mathcal{L}_m$) 355, 355b by comparing the corresponding target token index 324 with the corresponding high-level context vector (i.e., target token index prediction) 334. Thus, for each high-level context vector 334, the MLM module 330 learns to predict the target token index 314 at the corresponding time step using the cross-entropy loss 355b based on the target token index 314 generated by the quantizer 310 at the corresponding time step.

The unsupervised loss module 350 provides the unsupervised loss 355 including the contrastive self-supervised loss 355a and the cross-entropy loss 355b as feedback to the ASR model 200. The unsupervised loss 355 is based on the contrastive self-supervised loss 355a and on the cross-entropy loss 355b represented by:

$$\mathcal{L}_u = \mathcal{L}_c + \mathcal{L}_m + \alpha \mathcal{L}_d \quad (3)$$

In Equation 3, $\mathcal{L}_u$ represents the unsupervised loss 355 and α represents a weighting parameter. The unsupervised loss part 300a of the training process 300 may update parameters of the ASR model 200 based on the unsupervised loss 355.

Referring now to FIG. 3B, in some implementations the supervised loss part 300b further includes a decoder 340 and a supervised loss module 360. The MLM module 330 is configured to receive, as input, the contrastive context vector 322 generated by the contrastive net 320 at each of the plurality of time steps, and generate, as output, a high-level context vector ($\{m_i\}_{i=1}^T$) 334 at each of the plurality of time steps. That is, the MLM module 330 generates the high-level context vectors 334 by extracting high-level contextualized speech representations from the contrastive context vectors 322. Each high-level context vector 334 represents a target token index prediction generated by a linear layer.

The decoder 340 is configured to receive, as input, the high-level context vector 334 generated by the MLM module 330 at each of the plurality of time steps and predict speech recognition hypotheses 342 for the utterance. The decoder 340 may include a two layer 768 dimension long short-term memory (LSTM) based Recurrent Neural Network-Transducer (RNN-T) with 3072 hidden units. Here, the decoder 340 may generate a probability distribution over possible speech recognition hypotheses 342 for the corresponding high-level context vector 334. The supervised loss module 360 generates a supervised loss ($\mathcal{L}_s$) 365 by comparing the probability distribution over possible speech recognition hypotheses 342 and the ground-truth transcription 306. That is, the supervised loss module 360 compares the probability distribution over possible speech recognition hypotheses 342 for a respective transcribed speech utterance 304 with the ground-truth transcription corresponding to the respective transcribed speech utterance 304. In some examples, the supervised loss 365 includes a RNN-T loss. The supervised loss part 300b of the training process 300 may provide the supervised loss 365 as feedback to the ASR model 200. Thus, the supervised loss part 300b of the training process 300 may updated parameters of the ASR model 200 based on the supervised loss 365.

Referring back to FIGS. 3A and 3B, in some implementations the training process 300 determines a total loss based on the unsupervised loss 355 and the supervised loss 365 represented by:

$$\mathcal{L} = \mathcal{L}_s + \beta \mathcal{L}_u \qquad (4)$$

In Equation 4, $\mathcal{L}$ represents the total loss and $\beta$ represents a trade-off weight. Accordingly, the training process 300 may train the ASR model 200 using the total loss L such that the training process 300 jointly trains the ASR model 200 using the unsupervised loss 355 and the supervised loss 365. Notably, jointly training the ASR model 200 with total loss $\mathcal{L}$ eliminates the risk of the ASR model 200 forgetting the latent representations previously learned during pretraining because the training process 300 jointly (i.e., concurrently) trains the ASR model 200 using both the unsupervised loss 355 and the supervised loss 365. Moreover, the training process 300 eliminates the pretrained checkpoint selection because of the joint training approach. That is, the training process 300 jointly trains the ASR model 200 using the unsupervised loss 355 and the supervised loss 365 in a single-stage approach thereby eliminating the issues of pretraining the ASR model 200 using the two-stage approach.

Figure 4:
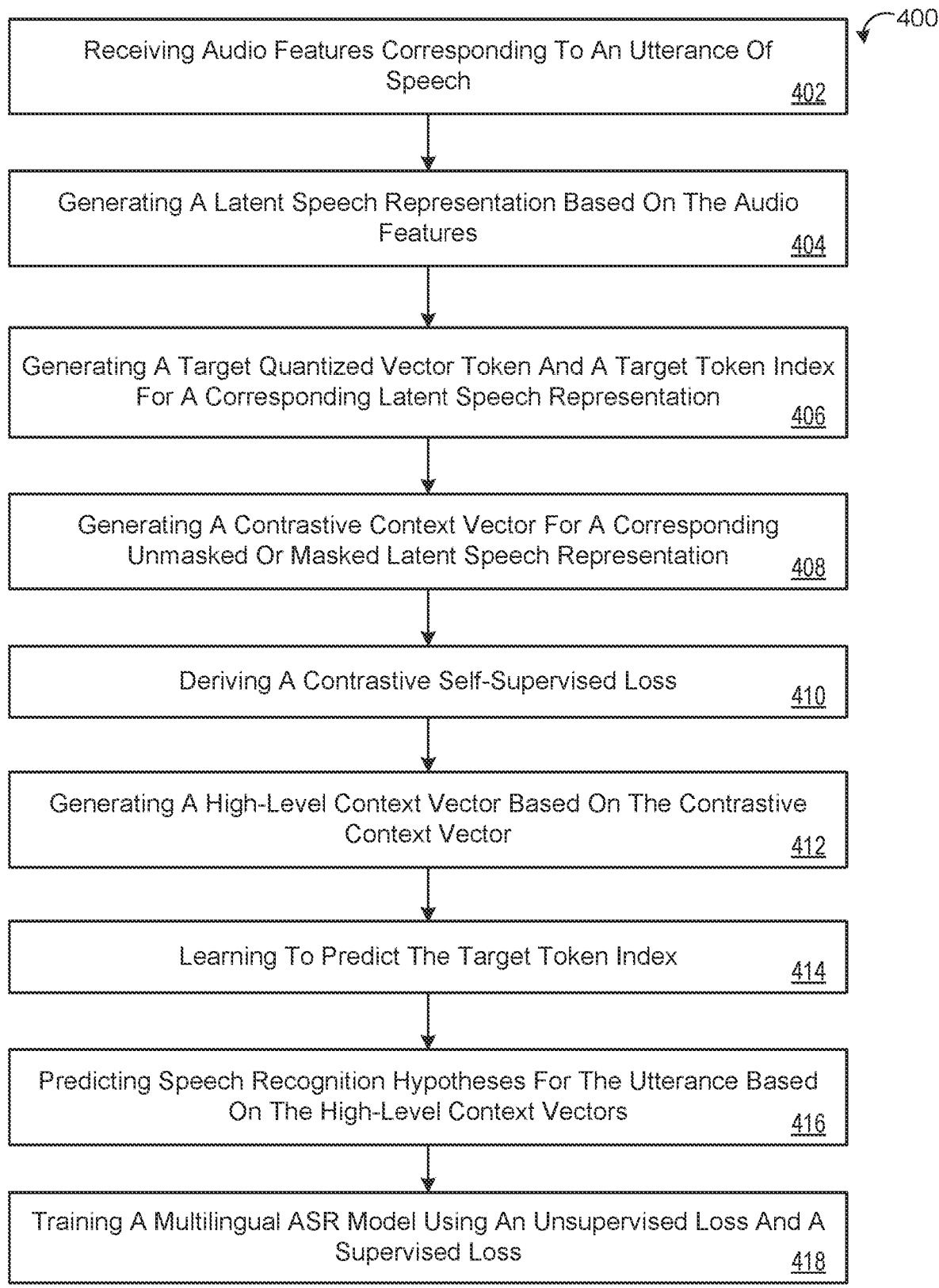
FIG. 4 is a flowchart of an example arrangement of operations for a method of jointly training an automatic speech recognition model using unsupervised and supervised training.
Figure 5:
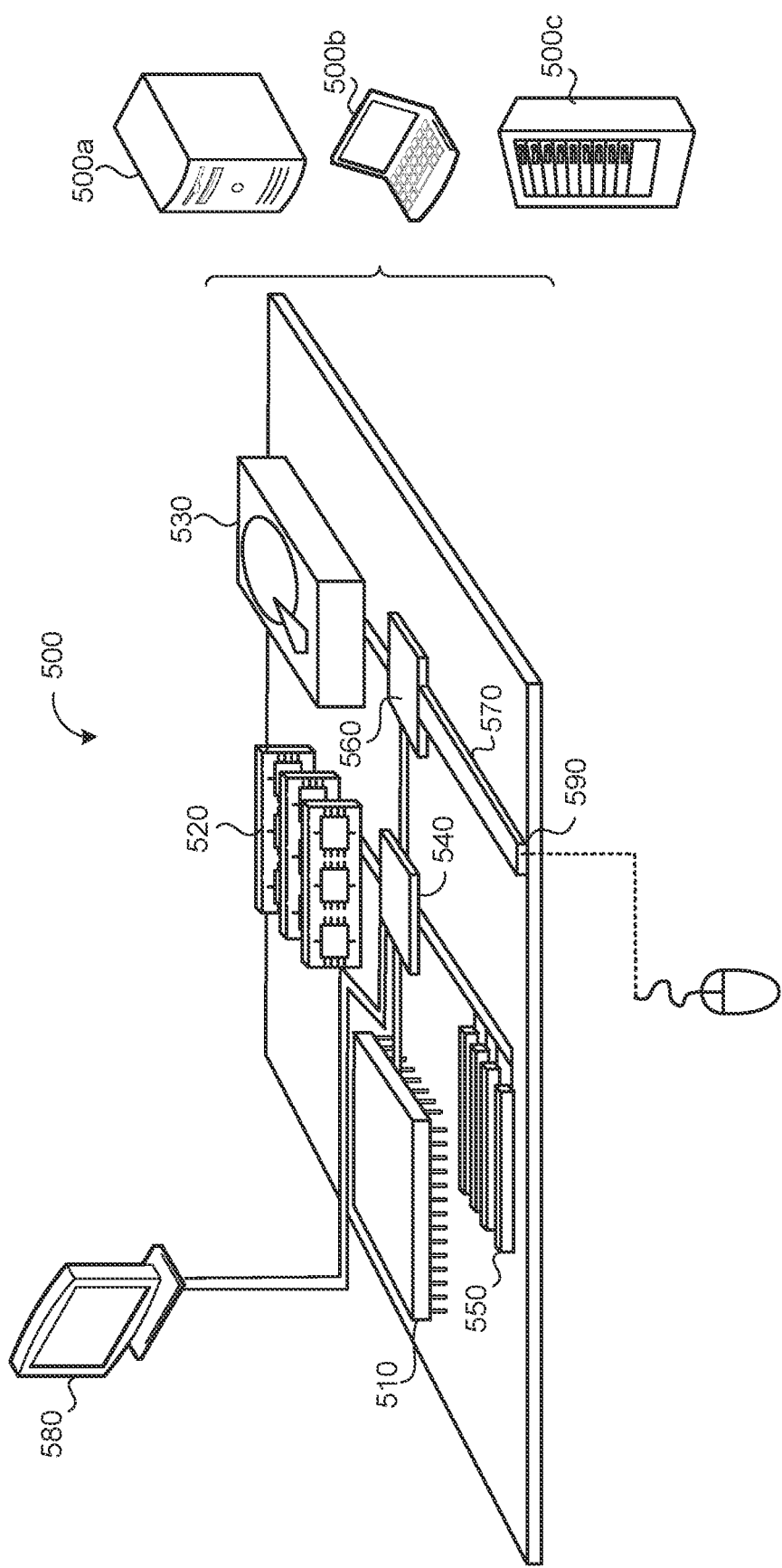
FIG. 5 is a schematic view of an example computing device that may be used to implement the systems and methods described herein.

FIG. 4 is a flowchart of an example arrangement of operations for a method 400 of jointly training an ASR model 200 using unsupervised and supervised training. The method 400 may execute on data processing hardware 510 (FIG. 5) using instructions stored on memory hardware 520 (FIG. 5). The data processing hardware 510 and the memory hardware 520 may reside on the remote computer/server 201 of FIG. 1 corresponding to a computing device 500 (FIG. 5).

At operation 402, the method 400 includes receiving audio features 110 corresponding to one of the un-transcribed speech utterances 302 or one of the transcribed speech utterances 304. At operation 404, the method 400 includes generating, at each of a plurality of time steps, a latent speech representation 212 based on the audio features 110. At operation 406, the method 400 includes generating, at each of the plurality of time steps, a target quantized vector token 312 and a target token index 314 for a corresponding latent speech representation 212. Here, the target token index 314 maps the corresponding latent speech representation 212 to the target quantized vector token 312 stored in a codebook 315. At operation 408, the method 400 includes generating, at each of the plurality of time steps, a contrastive context vector 322 for a corresponding unmasked or masked latent speech representation 212u, 212m. At operation 410, the method 400 includes deriving, at each of the plurality of time steps, a contrastive self-supervised loss 355a based on the corresponding contrastive context vector 322 and the corresponding target quantized vector token 312.

At operation 412, the method 400 includes generating, at each of the plurality of time steps, a high-level context vector 334 based on the contrastive context vector 322. At operation 414, for each high-level context vector 334, the method 400 includes learning to predict the target token index 314 at the corresponding time step using a cross-entropy loss 355b based on the target token index 314. At operation 416, the method 400 includes predicting speech recognition hypotheses 342 for the utterance based on the high-level context vectors 334. At operation 416, the method 400 includes training a multilingual ASR model 200 using an unsupervised loss 355 based on the contrastive self-supervised losses 355a and the cross-entropy losses 355b and a supervised loss 365 based on the predicted speech recognition hypotheses 342 and a ground-truth transcription 306 of the utterance 302, 304.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A joint unsupervised and supervised training (JUST) framework for training a multilingual automatic speech recognition (ASR) model, the JUST framework comprising:
a feature encoder configured to:
receive, as input, audio features corresponding to an utterance of speech; and
generate, at each of a plurality of time steps, a latent speech representation;
a quantizer configured to:
receive, as input, the latent speech representations generated by the feature encoder at each of the plurality of time steps; and generate, at each of the plurality of time steps, a target quantized vector token and a target token index for a corresponding latent speech representation generated by the feature encoder, wherein the target token index maps the corresponding latent speech representation to the target quantized vector token stored in a codebook;

a contrastive net configured to:
receive, as input, the latent speech representations generated by the feature encoder at each of the plurality of time steps after masking a subset of the latent speech representations;
generate, at each of the plurality of time steps, a contrastive context vector for the corresponding unmasked or masked latent speech representation; and
derive, at each of the plurality of time steps, a contrastive self-supervised loss based on the corresponding contrastive context vector and the corresponding target quantized vector token generated by the quantizer for the corresponding latent speech representation;

a masked language modeling (MLM) module configured to:
receive, as input, the contrastive context vector generated by the contrastive net at each of the plurality of time steps;
generate, at each of the plurality of time steps, a high-level context vector; and
for each high-level context vector, learn to predict the target token index at the corresponding time step using a cross-entropy loss based on the target token index generated by the quantizer at the corresponding time step; and a decoder configured to:
receive, as input, the high-level context vector generated by the MLM module at each of the plurality of time steps; and
predict speech recognition hypotheses for the utterance, wherein the multilingual ASR model is trained on:
an unsupervised loss based on the contrastive self-supervised loss and the cross-entropy; and
a supervised loss based on the predicted speech recognition hypotheses and a ground-truth transcription of the utterance.

2. The JUST framework of claim 1, wherein the feature encoder comprises two convolutional neural network (CNN) blocks.

3. The JUST framework of claim 1, wherein masking the subset of the latent speech representations comprises randomly replacing each latent speech representation in the subset of latent speech representations with a corresponding random vector.

4. The JUST framework of claim 1, wherein the contrastive self-supervised loss derived by the contrastive net is further based on K negative samples/distractors uniformly sampled from the target quantized vector token stored in the codebook that correspond to masked latent representations from the masked subset of latent representations.

5. The JUST framework of claim 1, wherein the unsupervised loss is further based on an entropy-based diversity loss associated with the codebook.

6. The JUST framework of claim 1, wherein the multilingual ASR model is trained on training utterances spoken in a plurality of different languages.

7. The JUST framework of claim 1, wherein training the multilingual ASR model comprises training the multilingual ASR model having no prior pretraining.

8. The JUST framework of claim 1, wherein training the multilingual ASR model comprises fine-tuning the multilingual ASR model from a pretrained checkpoint.

9. The JUST framework of claim 1, wherein training the multilingual ASR model comprises jointly training the multilingual ASR model on the unsupervised loss and the supervised loss.

10. The JUST framework of claim 1, wherein the supervised loss comprises a Recurrent Neural Network-Transducer (RNN-T) loss.

11. A computer-implemented method when executed by data processing hardware causes the data processing hardware to perform operations comprising:
receiving audio features corresponding to an utterance of speech;
generating, at each of a plurality of time steps, a latent speech representation based on the audio features;
generating, at each of the plurality of time steps, a target quantized vector token and a target token index for a corresponding latent speech representation, wherein the target token index maps the corresponding latent speech representation to the target quantized vector token stored in a codebook;
generating, at each of the plurality of time steps, a contrastive context vector for a corresponding unmasked or masked latent speech representation;
deriving, at each of the plurality of time steps, a contrastive self-supervised loss based on the corresponding contrastive context vector and the corresponding target quantized vector token;
generating, at each of the plurality of time steps, a high-level context vector based on the contrastive context vector;
for each high-level context vector, learning to predict the target token index at the corresponding time step using a cross-entropy loss based on the target token index;
predicting speech recognition hypotheses for the utterance based on the high-level context vectors; and
training a multilingual automatic speech recognition (ASR) model using an unsupervised loss based on the contrastive self-supervised losses and the cross-entropy losses and a supervised loss based on the predicted speech recognition hypotheses and a ground-truth transcription of the utterance.

12. The computer-implemented method of claim 11, wherein generating the latent speech representation comprises generating, by a feature encoder, the latent speech representation at each of the plurality of time steps, the feature encoder comprising two convolutional neural network (CNN) blocks.

13. The computer-implemented method of claim 11, wherein the operations further comprise masking a subset of the latent speech representations by randomly replacing each latent speech representation in the subset of latent speech representations with a corresponding random vector.

14. The computer-implemented method of claim 11, wherein the contrastive self-supervised loss is further based on K negative samples/distractors uniformly sampled from the target quantized vector token stored in the codebook that correspond to masked latent representations from a masked subset of latent representations.

15. The computer-implemented method of claim 11, wherein the unsupervised loss is further based on an entropy-based diversity loss associated with the codebook.

16. The computer-implemented method of claim 11, wherein the multilingual ASR model is trained on training utterances spoken in a plurality of different languages.

17. The computer-implemented method of claim 11, wherein training the multilingual ASR model comprises training the multilingual ASR model having no prior pre-training.

18. The computer-implemented method of claim 11, wherein training the multilingual ASR model comprises fine-tuning the multilingual ASR model from a pretrained checkpoint.

19. The computer-implemented method of claim 11, wherein training the multilingual ASR model comprises jointly training the multilingual ASR model on the unsupervised loss and the supervised loss.

20. The computer-implemented method of claim 11, wherein the supervised loss comprises a Recurrent Neural Network-Transducer (RNN-T) loss.

* * * * *